(12) United States Patent
Lai et al.

(10) Patent No.: US 11,548,797 B2
(45) Date of Patent: Jan. 10, 2023

(54) METHOD FOR ELECTROLYSIS-OZONE-CORROSION INHIBITOR/ELECTROLYSIS-OZONE-HYDROGEN PEROXIDE-CORROSION INHIBITOR COUPLING TREATMENT ON TOXIC AND REFRACTORY WASTEWATER

(71) Applicant: SICHUAN UNIVERSITY, Chengdu (CN)

(72) Inventors: Bo Lai, Chengdu (CN); Zhaokun Xiong, Chengdu (CN); Zhicheng Pan, Chengdu (CN); Yang Liu, Chengdu (CN); Peng Zhou, Chengdu (CN); Heng Zhang, Chengdu (CN); Chuanshu He, Chengdu (CN); You Li, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 17/763,229

(22) PCT Filed: Oct. 13, 2020

(86) PCT No.: PCT/CN2020/120546
§ 371 (c)(1),
(2) Date: Mar. 24, 2022

(87) PCT Pub. No.: WO2021/073486
PCT Pub. Date: Apr. 22, 2021

(65) Prior Publication Data
US 2022/0356086 A1 Nov. 10, 2022

(30) Foreign Application Priority Data
Oct. 14, 2019 (CN) .......................... 201910970649.9

(51) Int. Cl.
*C02F 1/46* (2006.01)
*C02F 1/467* (2006.01)
(Continued)

(52) U.S. Cl.
CPC ............ *C02F 1/4672* (2013.01); *C02F 1/722* (2013.01); *C02F 1/78* (2013.01); *C02F 5/083* (2013.01);
(Continued)

(58) Field of Classification Search
CPC ...... C02F 1/78; C02F 1/72; C02F 1/46; C02F 2303/04
See application file for complete search history.

(56) References Cited

FOREIGN PATENT DOCUMENTS

| CN | 101417835 A | 4/2009 |
|---|---|---|
| CN | 105906076 A | 8/2016 |

(Continued)

OTHER PUBLICATIONS

WO-2005065383-A2; Jul. 2005, WO; Alimi H (Year: 2005).*

*Primary Examiner* — Cameron J Allen
(74) *Attorney, Agent, or Firm* — Bayramoglu Law Offices LLC (57) ABSTRACT

A method for electrolysis-ozone-corrosion inhibitor/electrolysis-ozone-hydrogen peroxide-corrosion inhibitor coupling treatment on toxic and refractory wastewater includes the following steps: adding toxic and refractory wastewater to be treated into a wastewater treatment reaction tank equipped with a plate anode and a plate cathode, and starting a direct current (DC) power supply connected to the plate anode and the plate cathode to treat the toxic and refractory wastewater at an appropriate current density under stirring, during which a corrosion inhibitor and hydrogen peroxide are added to the toxic and refractory wastewater to be treated and ozone is introduced into the toxic and refractory waste-
(Continued)

water to be treated through an aeration device. The method can increase the production rate and production quantity of free radicals in a reaction system, effectively improve the treatment efficiency for toxic and refractory wastewater, and reduce the treatment cost.

5 Claims, 4 Drawing Sheets

(51) Int. Cl.
    *C02F 1/72*     (2006.01)
    *C02F 1/78*     (2006.01)
    *C02F 5/08*     (2006.01)
    *C02F 1/461*     (2006.01)

(52) U.S. Cl.
    CPC ............... *C02F 2001/46152* (2013.01); *C02F 2201/4617* (2013.01); *C02F 2201/782* (2013.01); *C02F 2201/784* (2013.01); *C02F 2209/40* (2013.01); *C02F 2209/44* (2013.01); *C02F 2303/08* (2013.01)

(56) References Cited

FOREIGN PATENT DOCUMENTS

| | | |
|---|---|---|
| CN | 106495370 A | 3/2017 |
| CN | 106517443 A | 3/2017 |
| CN | 106587456 A | 4/2017 |
| CN | 107090590 A | 8/2017 |
| CN | 108217862 A | 6/2018 |
| CN | 109467229 A | 3/2019 |
| CN | 110228878 A | 9/2019 |
| CN | 110589938 A | 12/2019 |
| JP | 2003126861 A | 5/2003 |

\* cited by examiner

METHOD FOR ELECTROLYSIS-OZONE-CORROSION INHIBITOR/ELECTROLYSIS-OZONE-HYDROGEN PEROXIDE-CORROSION INHIBITOR COUPLING TREATMENT ON TOXIC AND REFRACTORY WASTEWATER

CROSS REFERENCE TO THE RELATED APPLICATIONS

This application is the national phase entry of International Application No. PCT/CN2020/120546, filed on Oct. 13, 2020, which is based upon and claims priority to Chinese Patent Application No. 201910970649.9, filed on Oct. 14, 2019, the entire contents of which are incorporated herein by reference.

TECHNICAL FIELD

The present disclosure belongs to the field of toxic and refractory wastewater treatment, and particularly relates to a method for electrolysis-ozone-corrosion inhibitor/electrolysis-ozone-hydrogen peroxide-corrosion inhibitor coupling treatment on toxic and refractory wastewater.

BACKGROUND

The rapid development of the national economy promotes the process of industrialization in China, but also results in the production of a large amount of toxic, harmful, and refractory industrial wastewater. The sharp increase in the toxic wastewater discharge poses a serious threat to human health. There are many types of toxic and refractory wastewater, such as printing and dyeing wastewater, papermaking wastewater, pharmaceutical wastewater, oil field wastewater, electroplating wastewater, coking wastewater, and other organic synthesis chemical wastewater. The toxic and refractory wastewater has a complex composition and may contain other production raw materials and by-products, such as halides, nitro compounds, anilines, and phenols. These compounds generally have high toxicity, and may even have mutagenic, carcinogenic, and teratogenic effects. These pollutants are not easily decomposed in the environment and may easily enter the human body through a food chain, thereby seriously threatening human health. Since the toxic and refractory wastewater has high contents of toxic and harmful substances and poor biodegradability, it is difficult to achieve an expected treatment effect using a traditional physical, chemical, or biological technology, and a treatment cost is relatively high.

Advanced oxidation processes (AOPs) belong to wastewater pretreatment and advanced treatment technologies, and can reduce the toxicity of wastewater and improve the biodegradability of wastewater, and thus AOPs have been used to treat toxic and refractory pollutants in wastewater. In AOPs, a catalyst is typically used to catalyze the decomposition of hydrogen peroxide, persulfate, ozone, and other oxidants to generate reactive oxygen species (ROS) with high oxidation potential, and ROS can non-selectively decompose and convert toxic and refractory pollutants in wastewater, thereby achieving the purpose of reducing the wastewater toxicity and improving the biodegradability. More and more research has been focused on the treatment of organic pollutants by electrochemical process/AOP coupling technologies, where an electrochemical process/ozone process coupling technology can efficiently treat organic pollutants, such as electrochemical-peroxone technology or photoelectrochemical-peroxone technology. In the electrochemical-peroxone system, $H_2O_2$ can be generated in situ by introducing a mixed gas of $O_3$ and $O_2$ into an electrochemical reactor equipped with carbon-polytetrafluoroethylene (PTFE) electrodes; and the generated $H_2O_2$ and $O_3$ can undergo a peroxone reaction (a reaction between $H_2O_2$ and $O_3$) to generate hydroxyl radicals (.OH). However, electrodes used in existing electrochemical-peroxone systems are expensive electrodes such as Pt, boron-doped diamond (BDD), and carbon-PTFE, and the high electrode cost limits the applications of these systems. The research on using iron plates as electrodes to couple with ozone has also been proposed. Although the cost of the iron plate electrode is significantly lower than the cost of the above-mentioned expensive electrode, the use of iron plate electrodes has brought new problems, such as rapid electrode corrosion and short service life, so that the iron plate electrodes need to be replaced frequently, and the corrosion of the iron plate electrodes in a wastewater treatment process will result in a large amount of iron mud, easily causing secondary pollution. How to deal with a large amount of iron mud reasonably has become a new problem. Therefore, in general, the use of iron plate electrodes in the art cannot effectively reduce the treatment cost of toxic and refractory wastewater.

SUMMARY

The present disclosure is intended to overcome the shortcomings in the art and provide a method for electrolysis-ozone-corrosion inhibitor/electrolysis-ozone-hydrogen peroxide-corrosion inhibitor coupling treatment on toxic and refractory wastewater, which can solve the problems of the existing electrochemical-peroxone technology using iron plates as electrodes such as rapid electrode corrosion, short service life, and a large amount of iron mud, increase the production rate and production quantity of free radicals in a reaction system, improve the treatment efficiency for toxic and refractory wastewater, and reduce the treatment cost.

In order to achieve the above-mentioned objective of the present disclosure, the present disclosure provides a method for electrolysis-ozone-corrosion inhibitor coupling treatment on toxic and refractory wastewater and a method for electrolysis-ozone-hydrogen peroxide-corrosion inhibitor coupling treatment on toxic and refractory wastewater, and the two methods belong to a general inventive concept.

The method for electrolysis-ozone-corrosion inhibitor coupling treatment on toxic and refractory wastewater provided by the present disclosure includes the following steps:

adding toxic and refractory wastewater to be treated into a wastewater treatment reaction tank equipped with a plate anode and a plate cathode, and starting a direct current (DC) power supply connected to the plate anode and the plate cathode to treat the toxic and refractory wastewater for no more than 60 min at a current density of 1 mA/cm$^2$ to 100 mA/cm$^2$ under stirring, during which a corrosion inhibitor is added to the toxic and refractory wastewater to be treated and ozone is introduced into the toxic and refractory wastewater to be treated through an aeration device;

where the plate anode and the plate cathode are iron plates, stainless steel plates, aluminum plates, or aluminum oxide plates; and the corrosion inhibitor is at least one from the group consisting of silicate, chromate, molybdate, phosphate, polyphosphate, and polysilicate.

The method for electrolysis-ozone-hydrogen peroxide-corrosion inhibitor coupling treatment on toxic and refractory wastewater provided by the present disclosure includes the following steps:

adding toxic and refractory wastewater to be treated into a wastewater treatment reaction tank equipped with a plate anode and a plate cathode, and starting a DC power supply connected to the plate anode and the plate cathode to treat the toxic and refractory wastewater for no more than 60 min at a current density of 1 mA/cm$^2$ to 100 mA/cm$^2$ under stirring, during which a corrosion inhibitor and hydrogen peroxide are added to the toxic and refractory wastewater to be treated and ozone is introduced into the toxic and refractory wastewater to be treated through an aeration device;

where the plate anode and the plate cathode are iron plates, stainless steel plates, aluminum plates, or aluminum oxide plates; and the corrosion inhibitor is at least one from the group consisting of silicate, chromate, molybdate, phosphate, polyphosphate, and polysilicate.

In the method for electrolysis-ozone-hydrogen peroxide-corrosion inhibitor coupling treatment on toxic and refractory wastewater, the hydrogen peroxide may preferably be added in the form of a solution to the wastewater treatment reaction tank during the toxic and refractory wastewater treatment process; and the hydrogen peroxide may preferably be added at an amount of 1 mmol/h to 100 mmol/h per liter of an effective volume of the wastewater treatment reaction tank, and the amount of the hydrogen peroxide added is mainly determined according to the actual water quality of the toxic and refractory wastewater to be treated. Generally, the hydrogen peroxide may be industrial grade hydrogen peroxide with a concentration of 5% to 15%.

In the above two methods for treating toxic and refractory wastewater, the corrosion inhibitor may preferably be added in the form of a corrosion inhibitor solution to the wastewater treatment reaction tank during the toxic and refractory wastewater treatment process; the corrosion inhibitor may preferably be added at an amount of 1 mmol/h to 100 mmol/h per liter of the effective volume of the wastewater treatment reaction tank; and the corrosion inhibitor solution may have a concentration usually of 5% to 35% and preferably of 15% to 35%. In the above two methods for treating toxic and refractory wastewater, the ozone may preferably be introduced into the toxic and refractory wastewater to be treated through the aeration device at an amount of 1 g/h to 50 g/h per liter of the effective volume of the wastewater treatment reaction tank.

In the above two methods for treating toxic and refractory wastewater, the wastewater treatment reaction tank may be cylindrical; the plate anode and the plate cathode may have the same shape and area; an area of the plate anode or the plate cathode may be 40% to 80% of an area of a longitudinal section of the wastewater treatment reaction tank; and a distance between the plate anode and the plate cathode may be 20% to 60% of a diameter of the wastewater treatment reaction tank. The plate anode and the plate cathode are parallel to each other and are also parallel to an axis of the reaction tank, and the plate anode and the plate cathode are arranged at the same height.

In the above two methods for treating toxic and refractory wastewater, specific process parameters used in the toxic and refractory wastewater treatment process (such as current density, areas of the plate anode and plate cathode, the distance between the plate anode and the plate cathode, amounts of the corrosion inhibitor and ozone added, whether hydrogen peroxide needs to be added, and amount of hydrogen peroxide added) are all related to the specific water quality of the toxic and refractory wastewater to be treated, and in actual applications, the parameters are determined according to the specific water quality of the toxic and refractory wastewater to be treated. The higher the contents of toxic and refractory components in the toxic and refractory wastewater to be treated and the more difficult it is to degrade the toxic and refractory components, the higher the amounts of the corrosion inhibitor, ozone, and hydrogen peroxide to be added and the higher the current density to be adopted. For example, according to a different water quality of the toxic and refractory wastewater to be treated, a current density of 7.5 mA/cm$^2$ to 30 mA/cm$^2$ can be adopted, ozone can be introduced into the toxic and refractory wastewater to be treated through the aeration device at an amount of 3 g/h to 7 g/h per liter of the effective volume of the reaction tank, the corrosion inhibitor can be added at an amount of 15 mmol/h to 30 mmol/h per liter of the effective volume of the wastewater treatment reaction tank, and the hydrogen peroxide can be added at an amount of 10 mmol/h to 25 mmol/h per liter of the effective volume of the wastewater treatment reaction tank.

In the above two methods for treating toxic and refractory wastewater, the treatment of the toxic and refractory wastewater can usually be completed within a treatment time of no more than 60 min, and 90% or more of the toxic and refractory components can be removed within a treatment time of no more than 40 min.

In the above two methods for treating toxic and refractory wastewater, the wastewater treatment reaction tank may be composed of a cylindrical tank body with a closed lower end and an open upper end, and a sealing cover arranged at the open end of the tank body; and the wastewater treatment reaction tank may be connected to a residual ozone removal device via a pipeline, and the residual ozone removal device is provided to remove unused ozone during the toxic and refractory wastewater treatment process.

In the above two methods for treating toxic and refractory wastewater, the ozone introduced into the toxic and refractory wastewater to be treated through the aeration device may be generated by an ozone generator, and then transported to the aeration device via a pipeline.

In the above two methods for treating toxic and refractory wastewater, the aeration device may be an aeration plate, an aerator, or a microporous gas diffuser.

In the above two methods for treating toxic and refractory wastewater, a pH of the toxic and refractory wastewater to be treated has little impact on the wastewater treatment effect; and generally, the methods can treat toxic and refractory wastewater with a pH of 3 to 10.5.

In the above two methods for treating toxic and refractory wastewater, the existing wastewater treatment reaction tank can be used or the structure of the existing wastewater treatment reaction tank can be simply improved to treat toxic and refractory wastewater. A feasible structure of the wastewater treatment reaction tank is as follows:

The wastewater treatment reaction tank may be composed of a cylindrical tank body with a closed lower end and an open upper end, and a sealing cover arranged at the open end of the tank body. A stirring device may be provided inside the tank body, and a water inlet pipe, a water outlet pipe, an ozone delivery pipe, a corrosion inhibitor feeding pipe, and a hydrogen peroxide feeding pipe may be provided on the tank body. The sealing cover arranged at the open end of the tank body may be a conical cover body, and a residual ozone discharge pipe may be provided at the top end of the conical cover body.

The residual ozone discharge pipe may be connected to the residual ozone removal device provided to remove unused ozone during the toxic and refractory wastewater treatment process. The residual ozone removal device may be various existing ozone removal devices, for example, a reaction tank filled with a chemical reagent that can react with ozone or catalyze the decomposition of ozone may be adopted.

One end of the ozone delivery pipe may be connected to an ozone generator outside the tank body, and the other end may be located inside the tank body and connected to an aeration device. The aeration device may be a conventional aeration device, such as a common aeration plate, a common aerator, or a common microporous gas diffuser. A gas flow meter and a gas control valve may be provided on the ozone delivery pipe outside the tank body to adjust and control the flow rate of ozone entering the wastewater treatment reaction tank. The ozone generator may be a conventional ozone generator and can be purchased directly from the market.

The corrosion inhibitor feeding pipe may communicate with a corrosion inhibitor solution storage tank through a peristaltic pump, the hydrogen peroxide feeding pipe may communicate with a hydrogen peroxide solution storage tank through a peristaltic pump, and the water inlet pipe may communicate with a to-be-treated toxic and refractory wastewater reservoir through a water inlet pump.

Since the toxic and refractory wastewater itself may be corrosive and corrosive substances may also be generated during a toxic and refractory wastewater treatment process, in order to increase the service life of the wastewater treatment reaction tank, the water inlet pipe, water outlet pipe, ozone delivery pipe, residual ozone discharge pipe, corrosion inhibitor feeding pipe, and hydrogen peroxide feeding pipe may all be anti-corrosion silicone pipes; the aeration device may also be made of an anti-corrosion material; and the tank body and sealing cover of the wastewater treatment reaction tank may also be made of an anti-corrosion material.

The stirring device may be a mechanical stirring device or a magnetic stirring device.

A plate anode and a plate cathode may be arranged in the wastewater treatment reaction tank; the plate anode and the plate cathode may have the same shape and area and may both be rectangular; the plate anode and the plate cathode may be parallel to each other and may also be parallel to an axis of the tank body; the plate anode and the plate cathode may be arranged at the same height; an area of the plate anode or the plate cathode may be 40% to 80% of an area of a longitudinal section of the wastewater treatment reaction tank; and a distance between the plate anode and the plate cathode may be 20% to 60% of a diameter of the wastewater treatment reaction tank. The plate anode and the plate cathode may be connected to a DC power supply through an electric wire. The plate anode and the plate cathode may be selected from the group consisting of iron plates, stainless steel plates, aluminum plates, and aluminum oxide plates.

In the above two methods for treating toxic and refractory wastewater, when the toxic and refractory wastewater to be treated is added into the wastewater treatment reaction tank, at least the plate anode and the plate cathode should be completely submerged.

The above two methods for treating toxic and refractory wastewater can treat all kinds of toxic and refractory wastewater, such as wastewater with p-nitrophenol (PNP), acid orange 7 (AO7), dinitrodiazophenol (DDNP), and other refractory components, and shale gas hydraulic fracturing wastewater (HFW).

Compared with the prior art, the technical solutions provided by the present disclosure have the following beneficial technical effects:

1. The present disclosure provides a method for electrolysis-ozone-corrosion inhibitor coupling treatment on toxic and refractory wastewater and a method for electrolysis-ozone-hydrogen peroxide-corrosion inhibitor coupling treatment on toxic and refractory wastewater. Both methods are established with cheap iron plates, stainless steel plates, aluminum plates, or aluminum oxide plates as electrodes, where electrolysis and ozone reactions are integrated, and $Fe^{2+}$, $Fe^{2+}$, and $Al^{3+}$ generated in situ by electrolysis can efficiently catalyze the decomposition of ozone to produce free radicals. Moreover, due to the strengthening effect of electrolysis, a catalytic ozone reaction, a Fenton-like reaction, a peroxone reaction, a direct ozone molecular reaction, an electrocoagulation reaction, and the like can proceed simultaneously in the reactor, which can greatly increase the production rate and production quantity of free radicals. The additional addition of hydrogen peroxide can strengthen the Fenton-like reaction and the peroxone reaction with the participation of hydrogen peroxide, which can further increase the production rate and production quantity of free radicals and strengthen the efficiency and effect of wastewater treatment. Moreover, cheap electrode plates can reduce the equipment and wastewater treatment costs, and thus have important practical application values in wastewater treatment, especially in the field of toxic and refractory wastewater treatment.

2. In the method provided by the present disclosure, based on the electrolysis-ozone coupling or the electrolysis-ozone-hydrogen peroxide coupling, a corrosion inhibitor is added during the toxic and refractory wastewater treatment process to react with the electrode plate to form a corrosion-inhibiting film (such as iron silicate) on the electrode plate, which can slow down the corrosion of the electrode plate, increase the service life of the electrode plate, reduce the operating cost, and greatly reduce iron mud produced due to the corrosion of the electrode plate during the wastewater treatment process, thereby reducing secondary pollution. In addition, the corrosion-inhibiting product film (such as iron silicate) formed on the surface of the electrode plate can efficiently catalyze the decomposition of ozone, which can further increase the production rate and production quantity of free radicals in a reaction system, thereby enhancing the treatment efficiency for the toxic and refractory wastewater. The method provided by the present disclosure can effectively solve the problems of the existing electrochemical-peroxone technology using iron plates as electrodes such as rapid electrode corrosion, short service life, and a large amount of iron mud, increase the production rate and production quantity of free radicals in a reaction system, significantly improve the treatment efficiency for toxic and refractory wastewater, and reduce the treatment cost.

3. Experiments show that, when used to treat toxic and refractory wastewater under the addition of a corrosion inhibitor on the basis of electrolysis-ozone coupling, the electrolysis-ozone-corrosion inhibitor coupling method of the present disclosure can significantly improve the degradation efficiency for toxic and refractory wastewater, effectively alleviate the rapid corrosion of iron plate electrodes, and reduce the generation of iron mud, thereby extending a service life of the iron plate electrodes. For the treatment of 200 mg/L N, N-dimethylacetamide (DMAC) wastewater, a method without the addition of a corrosion inhibitor requires more than 60 min to achieve a DMAC removal rate of 100%, but the method of the present disclosure only requires 20 min, where the treatment efficiency for toxic and refractory wastewater is increased by more than twice and no iron mud is produced during the treatment process. The present disclosure effectively solves the problems of the existing electrochemical-peroxone technology using iron plates as electrodes such as rapid electrode corrosion, short service life, and a large amount of iron mud. On the basis of electrolysis-ozone-corrosion inhibitor coupling, the electrolysis-ozone-hydrogen peroxide-corrosion inhibitor coupling method provided by the present disclosure is used to treat toxic and refractory wastewater under the addition of hydrogen peroxide, where the toxic and refractory wastewater is 200 mg/L DMAC, and a treatment time to achieve a DMAC removal rate of 100% is shortened from 20 min to no more than 10 min, indicating that the treatment efficiency is more than doubled.

BRIEF DESCRIPTION OF THE DRAWINGS

FIGS. 2A-2C show scanning electron microscopy (SEM) images of the iron plate electrode, where

FIGS. 3A-3D show X-ray photoelectron spectroscopy (XPS) spectra for the surface of the iron plate electrode treated in Example 1, where

DETAILED DESCRIPTION OF THE EMBODIMENTS

The method for electrolysis-ozone-corrosion inhibitor/electrolysis-ozone-hydrogen peroxide-corrosion inhibitor coupling treatment on toxic and refractory wastewater of the present disclosure is further described below through examples.

In the following examples, the wastewater treatment reaction tank used may be composed of a cylindrical tank body with a closed lower end and an open upper end, and a sealing cover arranged at the open end of the tank body. A stirring device may be provided inside the tank body, and a water inlet pipe, a water outlet pipe, an ozone delivery pipe, a corrosion inhibitor feeding pipe, and a hydrogen peroxide feeding pipe may be provided on the tank body. The sealing cover arranged at the open end of the tank body may be a conical cover body, and a residual ozone discharge pipe may be provided at the top end of the conical cover body.

The residual ozone discharge pipe may be connected to the residual ozone removal device provided to remove unused ozone during the toxic and refractory wastewater treatment process. The residual ozone removal device may be various existing ozone removal devices, for example, a reaction tank filled with a chemical reagent that can react with ozone or catalyze the decomposition of ozone may be adopted.

One end of the ozone delivery pipe may be connected to an ozone generator outside the tank body, and the other end may be located inside the tank body and connected to an aeration device. The aeration device may be a conventional aeration device, such as a common aeration plate, a common aerator, or a common microporous gas diffuser. A gas flow meter and a gas control valve may be provided on the ozone delivery pipe outside the tank body to adjust and control the flow rate of ozone entering the wastewater treatment reaction tank. The ozone generator may be a conventional ozone generator and can be purchased directly from the market.

The corrosion inhibitor feeding pipe may communicate with a corrosion inhibitor solution storage tank through a peristaltic pump, the hydrogen peroxide feeding pipe may communicate with a hydrogen peroxide solution storage tank through a peristaltic pump, and the water inlet pipe may communicate with a to-be-treated toxic and refractory wastewater reservoir through a water inlet pump.

Since the toxic and refractory wastewater itself may be corrosive and corrosive substances may also be generated during a toxic and refractory wastewater treatment process, in order to increase the service life of the wastewater treatment reaction tank, the water inlet pipe, water outlet pipe, ozone delivery pipe, residual ozone discharge pipe, corrosion inhibitor feeding pipe, and hydrogen peroxide feeding pipe may all be anti-corrosion silicone pipes; the aeration device may also be made of an anti-corrosion material; and the tank body and sealing cover of the wastewater treatment reaction tank may also be made of an anti-corrosion material.

The stirring device may be a mechanical stirring device or a magnetic stirring device.

A plate anode and a plate cathode may be arranged in the wastewater treatment reaction tank; the plate anode and the plate cathode may have the same shape and area and may both be rectangular; the plate anode and the plate cathode may be parallel to each other and may also be parallel to an axis of the tank body; the plate anode and the plate cathode may be arranged at the same height; an area of the plate anode or the plate cathode may be 40% to 80% of an area of a longitudinal section of the wastewater treatment reaction tank; and a distance between the plate anode and the plate cathode may be 20% to 60% of a diameter of the wastewater treatment reaction tank. The plate anode and the plate cathode may be connected to a DC power supply through an electric wire. The plate anode and the plate cathode may be selected from the group consisting of iron plates, stainless steel plates, aluminum plates, and aluminum oxide plates.

A method for treating wastewater using the above-mentioned wastewater treatment reaction tank is as follows:

A corrosion inhibitor is prepared into a corrosion inhibitor solution with a suitable concentration and stored in the corrosion inhibitor solution storage tank, and hydrogen peroxide is prepared into a hydrogen peroxide solution with a suitable concentration and stored in the hydrogen peroxide solution storage tank. Toxic and refractory wastewater to be treated is pumped by the water inlet pump into the wastewater treatment reaction tank through the water inlet pipe until the toxic and refractory wastewater to be treated at least submerges the plate anode and the plate cathode, and then the DC power supply connected to the plate anode and the plate cathode is started to treat the toxic and refractory wastewater at an appropriate current density under stirring, during which the corrosion inhibitor solution is pumped by a peristaltic pump into the wastewater treatment reaction tank through the corrosion inhibitor feeding pipe at an appropriate flow rate, the hydrogen peroxide solution is pumped by a peristaltic pump into the wastewater treatment reaction tank through the hydrogen peroxide feeding pipe at an appropriate flow rate, and ozone generated by the ozone generator is introduced into the toxic and refractory wastewater to be treated through the ozone delivery pipe and the aeration device; then unreacted ozone in the wastewater treatment reaction tank is introduced into the residual ozone removal device through the residual ozone discharge pipe for removal; and after the toxic and refractory wastewater treatment is completed, the wastewater is discharged through the water outlet pipe.

Example 1

In this example, a method for electrolysis-ozone-corrosion inhibitor coupling treatment on toxic and refractory wastewater was provided. The toxic and refractory wastewater to be treated was DMAC wastewater with a concentration of 200 mg/L. In the wastewater treatment process, the initial pH of DMAC wastewater was 6.6 without an adjustment. The method included the following steps:

A wastewater treatment reaction tank with the structure described above was adopted. Specifically, a plate anode and a plate cathode used were rectangular iron plates; an area of the plate anode or the plate cathode was 60% of an area of a longitudinal section of the wastewater treatment reaction tank; and a distance between the plate anode and the plate cathode was 40% of a diameter of the wastewater treatment reaction tank. A specific stirring device used was a mechanical stirring device, and a specific aeration device was an aeration plate.

Figure 1:
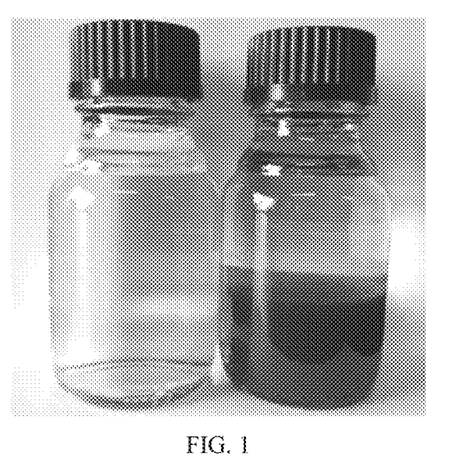
FIG. 1 is a picture of toxic and refractory wastewater treated in Example 1 and Comparative Example 1, where the left bottle corresponds to Example 1 and the right bottle corresponds to Comparative Example 1.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 10 mA/cm$^2$ under stirring, during which a corrosion inhibitor solution was pumped by a peristaltic pump into the wastewater treatment reaction tank at an amount of 15 mmol/h per liter of the effective volume of the wastewater treatment reaction tank (a pH of the toxic and refractory wastewater was increased to 10.0 after the corrosion inhibitor was added) and ozone generated by the ozone generator was introduced into the toxic and refractory wastewater to be treated through the ozone delivery pipe and the aeration device at an amount of 3 g/h per liter of the effective volume of the wastewater treatment reaction tank. The corrosion inhibitor solution was a sodium silicate solution with a concentration of 30%. During the wastewater treatment process, real-time sampling was conducted to detect a DMAC concentration, and detection results showed that, after the wastewater was treated for 20 min, a removal rate of DMAC in the wastewater to be treated reached 100%. A picture of effluent wastewater after the treatment was shown in the left bottle of FIG. 1. As shown in FIG. 1, no iron mud was produced during the wastewater treatment process, and thus no secondary pollution was caused, indicating that the method provided by the present disclosure can effectively alleviate the electrode corrosion.

Figure 2A:
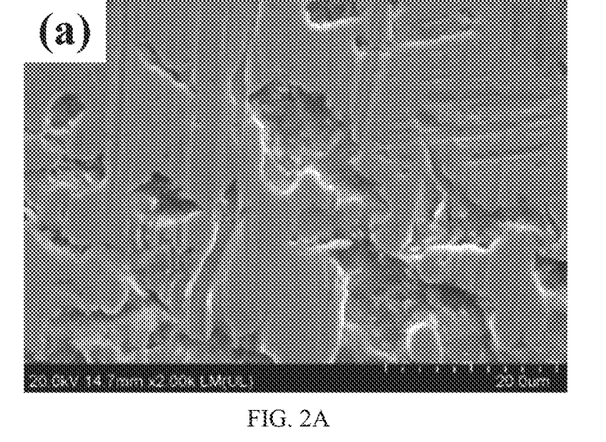
FIG. 2A shows an SEM image of the iron plate electrode before the toxic and refractory wastewater treatment.
Figure 2B:
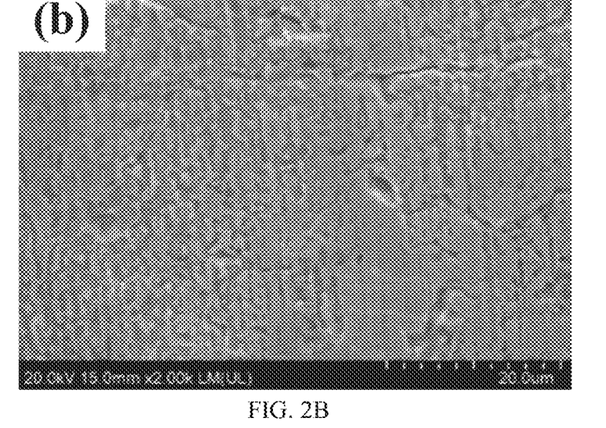
FIG. 2B shows an SEM image of the iron plate electrode after the treatment in Example 1.

Before the treatment of the toxic and refractory wastewater was started, the plate anode and plate cathode (iron plate electrodes) used in this example were subjected to an SEM test, and results were shown in FIG. 2A. After the treatment of the toxic and refractory wastewater was completed, the plate anode and plate cathode were taken out from the wastewater treatment reaction tank and subjected to an SEM test, and results were shown in FIG. 2B. It can be seen from FIG. 2A and FIG. 2B that, after the method of the present disclosure was used to treat the toxic and refractory wastewater on the basis of adding the corrosion inhibitor, the iron plate electrodes were basically not corroded during the toxic and refractory wastewater treatment process, and in the toxic and refractory wastewater treatment process, a film layer was formed on the surface of the iron plate electrodes. XPS was used to analyze the chemical composition of the surface of the iron plate electrode after the treatment of the toxic and refractory wastewater was completed, and results were shown in FIGS. 3A-3D. It can be seen from FIGS. 3A-3D that the film formed on the surface of the iron plate electrode is composed of iron silicate, which has the ability to efficiently catalyze the decomposition of ozone to generate free radicals, and can further increase the production rate and production quantity of free radicals in the reaction system, thereby enhancing the treatment efficiency for the toxic and refractory wastewater.

Comparative Example 1

In this comparative example, a method for electrolysis-ozone coupling treatment on toxic and refractory wastewater was provided, where no corrosion inhibitor was added. The toxic and refractory wastewater to be treated was DMAC wastewater with a concentration of 200 mg/L. In the wastewater treatment process, the initial pH of DMAC wastewater was 6.6 without an adjustment. In this comparative example, the wastewater treatment reaction tank used was exactly the same as that of Example 1; and operations were the same as that of Example 1 except that no corrosion inhibitor was added, which were specified as follows:

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 10 mA/cm$^2$ under stirring, during which ozone generated by the ozone generator was introduced into the toxic and refractory wastewater to be treated through the ozone delivery pipe and the aeration device at an amount of 3 g/h per liter of the effective volume of the wastewater treatment reaction tank. In the wastewater treatment process, real-time sampling was conducted to detect a DMAC concentration, and detection results showed that, after the wastewater was treated for 60 min, a removal rate of DMAC in the wastewater to be treated reached 91.5%, and a large amount of iron mud was produced during the treatment, where 0.4 L of iron mud was produced in the treatment of 1 L of wastewater. A picture of effluent wastewater after the treatment was shown in the right bottle of FIG. 1, where the turbid substance in a lower part of the right bottle was iron mud, causing secondary pollution.

Figure 2C:
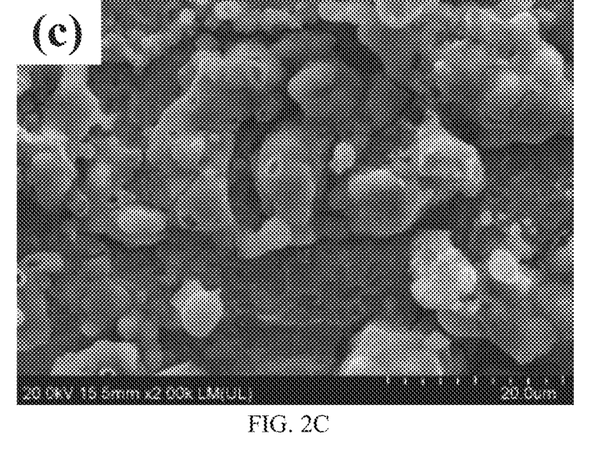
FIG. 2C shows an SEM image of the iron plate electrode after the treatment in Comparative Example 1.
Figure 3A:
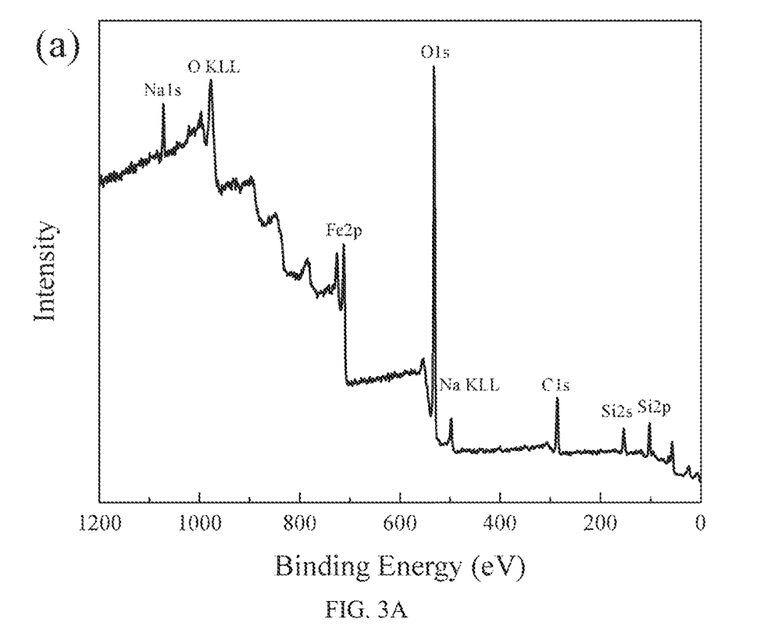
FIG. 3A shows an XPS spectrum of an iron silicate complex.
Figure 3B:
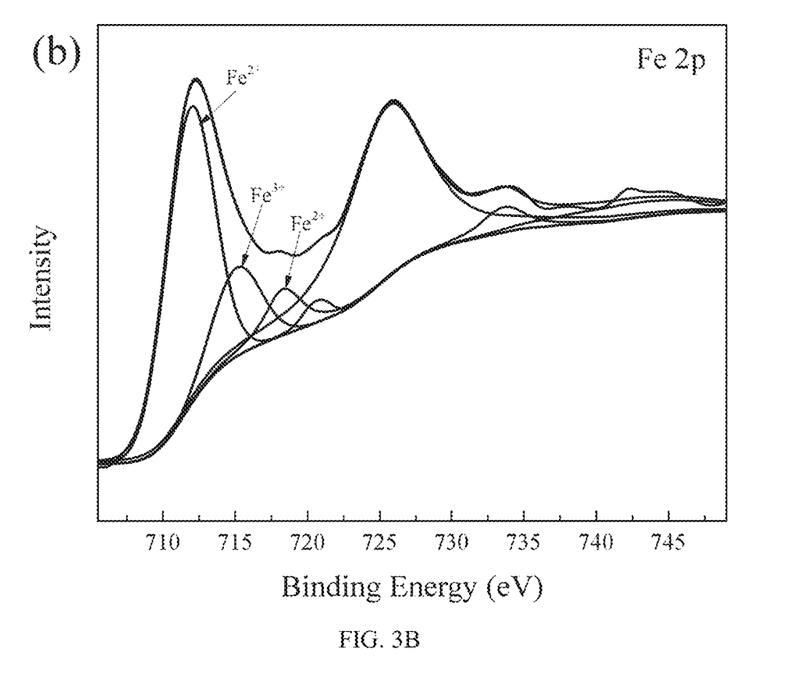
FIG. 3B shows an XPS spectrum of Fe2p.
Figure 3C:
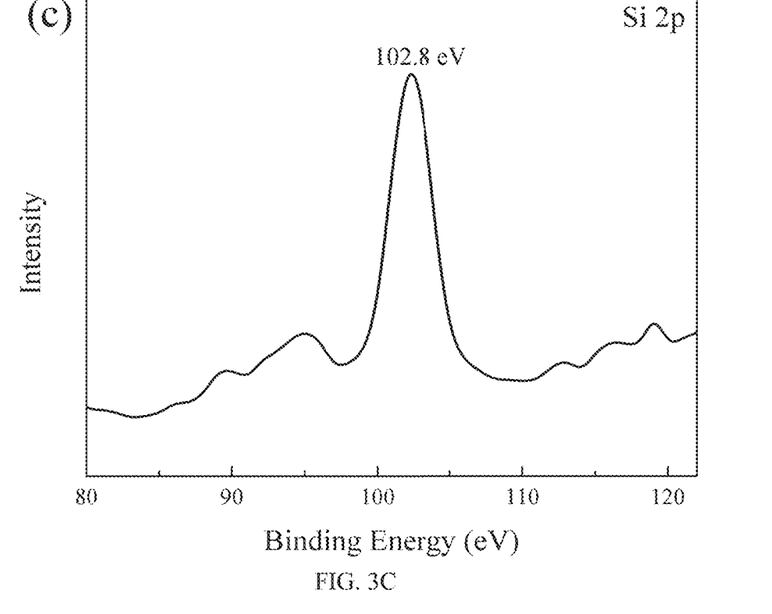
FIG. 3C shows an XPS spectrum of Si2p.
Figure 3D:
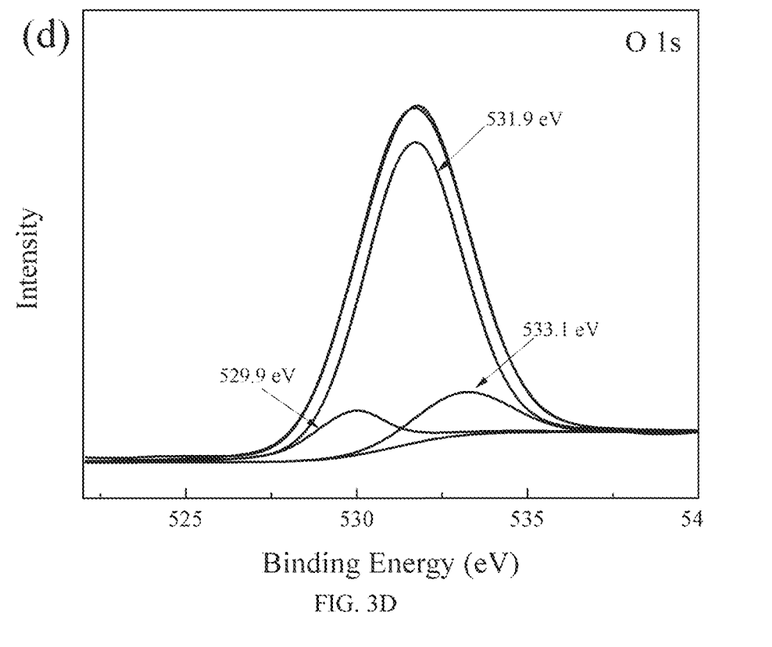
FIG. 3D shows an XPS spectrum of O1s.

After the treatment of the toxic and refractory wastewater was completed, the plate anode and plate cathode were taken out from the wastewater treatment reaction tank and subjected to an SEM test, and results were shown in FIG. 2C. It can be seen from FIG. 2A and FIG. 2C that, after the method of Comparative Example 1 was used to treat the toxic and refractory wastewater without the addition of a corrosion inhibitor, the iron plate electrodes were severely corroded during the toxic and refractory wastewater treatment process, and a large number of corrosion products were formed on the surface of the iron plate electrodes, such that the service life of the iron plate electrodes was greatly reduced and the iron mud produced by the iron plate electrodes caused secondary pollution.

Comparative Example 2

In this comparative example, a method for electrolysis treatment on toxic and refractory wastewater was provided, where no corrosion inhibitor or ozone was added. The toxic and refractory wastewater to be treated was DMAC wastewater with a concentration of 200 mg/L. In the wastewater treatment process, the initial pH of DMAC wastewater was 6.6 without an adjustment. In this comparative example, the wastewater treatment reaction tank used was exactly the same as that of Example 1; and operations were the same as that of Example 1 except that no corrosion inhibitor or ozone was added, which were specified as follows:

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 10 mA/cm$^2$ under stirring. In the wastewater treatment process, real-time sampling was conducted to detect a DMAC concentration, and detection results showed that, after the wastewater was treated for 60 min, a removal rate of DMAC in the wastewater to be treated reached 4.8%, and iron mud was produced during the treatment, causing secondary pollution.

Comparative Example 3

In this comparative example, a method for ozone treatment on toxic and refractory wastewater was provided, where no corrosion inhibitor was added and no energization was conducted for electrolysis. The toxic and refractory wastewater to be treated was DMAC wastewater with a concentration of 200 mg/L. In the wastewater treatment process, the initial pH of DMAC wastewater was 6.6 without an adjustment. In this comparative example, the wastewater treatment reaction tank used was exactly the same as that of Example 1; and operations were the same as that of Example 1 except that no corrosion inhibitor was added and no energization was conducted, which were specified as follows:

The toxic and refractory wastewater to be treated was added into the aforementioned wastewater treatment reaction tank equipped with the plate anode and plate cathode until the toxic and refractory wastewater to be treated at least submerged the plate anode and plate cathode, and then without the DC power supply connected to the plate anode and plate cathode being started, the toxic and refractory wastewater was treated under stirring, during which ozone generated by the ozone generator was introduced into the toxic and refractory wastewater to be treated through the ozone delivery pipe and the aeration device at an amount of 3 g/h per liter of the effective volume of the wastewater treatment reaction tank. In the wastewater treatment process, real-time sampling was conducted to detect a DMAC concentration, and detection results showed that, after the wastewater was treated for 60 min, a removal rate of DMAC in the wastewater to be treated reached 19.6%.

It can be seen from Comparative Examples 1 to 3 that, compared with the treatment of toxic and refractory wastewater by electrolysis and ozone alone, the electrolysis-ozone coupling treatment of toxic and refractory wastewater can significantly improve the degradation efficiency for toxic and refractory wastewater, and can increase a removal rate of 200 mg/L DMAC to 91.5% (Comparative Example 1) at 60 min from 4.8% (Comparative Example 2) and 19.6% (Comparative Example 3) at 60 min. It can be seen from Example 1 and Comparative Example 1 that, with the addition of a corrosion inhibitor on the basis of the electrolysis-ozone coupling, the method provided by the present disclosure can significantly improve the degradation efficiency for toxic and refractory wastewater, effectively alleviating the rapid corrosion of iron plate electrodes, and reduce the generation of iron mud, thereby extending a service life of the iron plate electrodes. For the treatment of 200 mg/L DMAC wastewater, a method without the addition of a corrosion inhibitor requires more than 60 min to achieve a DMAC removal rate of 100%, but the method of the present disclosure only requires 20 min, where the treatment efficiency for toxic and refractory wastewater is increased by more than twice and no iron mud is produced during the treatment process. The present disclosure effectively solves the problems of the existing electrochemical-peroxone technology using iron plates as electrodes such as rapid electrode corrosion, short service life, and a large amount of iron mud, increases the production rate and production quantity of free radicals in a reaction system, improves the treatment efficiency for toxic and refractory wastewater, and reduces the treatment cost.

Example 2

In this example, a method for electrolysis-ozone-corrosion inhibitor coupling treatment on toxic and refractory wastewater was provided. The toxic and refractory wastewater to be treated was PNP wastewater with a concentration of 500 mg/L. In the wastewater treatment process, the initial pH of PNP wastewater was 6.4 without an adjustment. The method included the following steps.

A wastewater treatment reaction tank with the structure described above was adopted. Specifically, a plate anode and a plate cathode used were rectangular stainless steel plates; an area of the plate anode or the plate cathode was 80% of an area of a longitudinal section of the wastewater treatment reaction tank; and a distance between the plate anode and the plate cathode was 60% of a diameter of the wastewater treatment reaction tank. A specific stirring device used was a mechanical stirring device, and a specific aeration device was an aerator.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 15 mA/cm$^2$ under stirring, during which a corrosion inhibitor solution was pumped by a peristaltic pump into the wastewater treatment reaction tank at an amount of 15 mmol/h per liter of the effective volume of the wastewater treatment reaction tank (a pH of the toxic and refractory wastewater was increased to 10.3 after the corrosion inhibitor was added) and ozone generated by the ozone generator was introduced into the toxic and refractory wastewater to be treated through the ozone delivery pipe and the aeration device at an amount of 3 g/h per liter of the effective volume of the wastewater treatment reaction tank. The corrosion inhibitor solution was a sodium silicate solution with a concentration of 30%. In the wastewater treatment process, real-time sampling was conducted to detect a PNP concentration, and detection results showed that, after the wastewater was treated for 25 min, a removal rate of PNP in the wastewater to be treated reached 100%, and no iron mud was produced during the treatment, causing no secondary pollution.

Example 3

In this example, a method for electrolysis-ozone-corrosion inhibitor coupling treatment on toxic and refractory wastewater was provided. The toxic and refractory wastewater to be treated was AO7 wastewater with a concentration of 1,000 mg/L. In the wastewater treatment process, the initial pH of AO7 wastewater was 3.0 without an adjustment. The method included the following steps:

A wastewater treatment reaction tank with the structure described above was adopted. Specifically, a plate anode and a plate cathode used were rectangular aluminum plates; an area of the plate anode or the plate cathode was 50% of an area of a longitudinal section of the wastewater treatment reaction tank; and a distance between the plate anode and the plate cathode was 50% of a diameter of the wastewater treatment reaction tank. A specific stirring device used was a mechanical stirring device, and a specific aeration device was a microporous gas diffuser.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 20 mA/cm$^2$ under stirring, during which a corrosion inhibitor solution was pumped by a peristaltic pump into the wastewater treatment reaction tank at an amount of 20 mmol/h per liter of the effective volume of the wastewater treatment reaction tank (a pH of the toxic and refractory wastewater was increased to 7.8 after the corrosion inhibitor was added) and ozone generated by the ozone generator was introduced into the toxic and refractory wastewater to be treated through the ozone delivery pipe and the aeration device at an amount of 4 g/h per liter of the effective volume of the wastewater treatment reaction tank. The corrosion inhibitor solution was a sodium molybdate solution with a concentration of 35%. In the wastewater treatment process, real-time sampling was conducted to detect an AO7 concentration, and detection results showed that, after the wastewater was treated for 30 min, a removal rate of AO7 in the wastewater to be treated reached 100%, a chroma removal rate also reached 100%, and no iron mud was produced during the treatment, causing no secondary pollution.

Example 4

In this example, a method for electrolysis-ozone-corrosion inhibitor coupling treatment on toxic and refractory wastewater was provided. The toxic and refractory wastewater to be treated was DDNP wastewater with a chemical oxygen demand (COD) concentration of 1,250 mg/L. In the wastewater treatment process, the initial pH of DDNP wastewater was 5.7 without an adjustment. The method included the following steps:

A wastewater treatment reaction tank with the structure described above was adopted. Specifically, a plate anode and a plate cathode used were rectangular iron plates; an area of the plate anode or the plate cathode was 40% of an area of a longitudinal section of the wastewater treatment reaction tank; and a distance between the plate anode and the plate cathode was 20% of a diameter of the wastewater treatment reaction tank. A specific stirring device used was a mechanical stirring device, and a specific aeration device was an aeration plate.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 20 mA/cm$^2$ under stirring, during which a corrosion inhibitor solution was pumped by a peristaltic pump into the wastewater treatment reaction tank at an amount of 20 mmol/h per liter of the effective volume of the wastewater treatment reaction tank (a pH of the toxic and refractory wastewater was increased to 9.7 after the corrosion inhibitor was added) and ozone generated by the ozone generator was introduced into the toxic and refractory wastewater to be treated through the ozone delivery pipe and the aeration device at an amount of 5 g/h per liter of the effective volume of the wastewater treatment reaction tank. The corrosion inhibitor solution was a sodium phosphate solution with a concentration of 30%. In the wastewater treatment process, real-time sampling was conducted to detect a DDNP concentration, and detection results showed that, after the wastewater was treated for 30 min, a removal rate of DDNP in the wastewater to be treated reached 98.5%, a chroma removal rate also reached 99.4%, and no iron mud was produced during the treatment, causing no secondary pollution.

Example 5

In this example, a method for electrolysis-ozone-corrosion inhibitor coupling treatment on toxic and refractory wastewater was provided. The toxic and refractory wastewater to be treated was shale gas HFW with a COD concentration of 3,548 mg/L. In the wastewater treatment process, the initial pH of the wastewater was 6.7 without an adjustment. The method included the following steps:

A wastewater treatment reaction tank with the structure described above was adopted. Specifically, a plate anode and a plate cathode used were rectangular iron plates; an area of the plate anode or the plate cathode was 70% of an area of a longitudinal section of the wastewater treatment reaction tank; and a distance between the plate anode and the plate cathode was 40% of a diameter of the wastewater treatment reaction tank. A specific stirring device used was a mechanical stirring device, and a specific aeration device was an aeration plate.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 25 mA/cm$^2$ under stirring, during which a corrosion inhibitor solution was pumped by a peristaltic pump into the wastewater treatment reaction tank at an amount of 30 mmol/h per liter of the effective volume of the wastewater treatment reaction tank (a pH of the toxic and refractory wastewater was increased to 10.1 after the corrosion inhibitor was added) and ozone generated by the ozone generator was introduced into the toxic and refractory wastewater to be treated through the ozone delivery pipe and the aeration device at an amount of 7 g/h per liter of the effective volume of the wastewater treatment reaction tank. The corrosion inhibitor solution was a sodium silicate solution with a concentration of 35%. In the wastewater treatment process, real-time sampling was conducted to detect a COD concentration, and detection results showed that, after the wastewater was treated for 40 min, a removal rate of COD in the wastewater to be treated reached 95.8%, and no iron mud was produced during the treatment, causing no secondary pollution.

Example 6

In this example, a method for electrolysis-ozone-hydrogen peroxide-corrosion inhibitor coupling treatment on toxic and refractory wastewater was provided. The toxic and refractory wastewater to be treated was DMAC wastewater with a concentration of 200 mg/L. In the wastewater treatment process, the initial pH of DMAC wastewater was 6.6 without an adjustment. The method included the following steps:

A wastewater treatment reaction tank with the structure described above was adopted. Specifically, a plate anode and a plate cathode used were rectangular iron plates; an area of the plate anode or the plate cathode was 60% of an area of a longitudinal section of the wastewater treatment reaction tank; and a distance between the plate anode and the plate cathode was 40% of a diameter of the wastewater treatment reaction tank. A specific stirring device used was a mechanical stirring device, and a specific aeration device was an aeration plate.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 7.5 $mA/cm^2$ under stirring, during which a corrosion inhibitor solution was pumped by a peristaltic pump into the wastewater treatment reaction tank at an amount of 15 mmol/h per liter of the effective volume of the wastewater treatment reaction tank (a pH of the toxic and refractory wastewater was increased to 10.5 after the corrosion inhibitor was added), industrial grade hydrogen peroxide with a concentration of 10% was pumped by a peristaltic pump into the wastewater treatment reaction tank at an amount of 10 mmol/h per liter of the effective volume of the wastewater treatment reaction tank, and ozone generated by the ozone generator was introduced into the toxic and refractory wastewater to be treated through the ozone delivery pipe and the aeration device at an amount of 3 g/h per liter of the effective volume of the wastewater treatment reaction tank. The corrosion inhibitor solution was a sodium silicate solution with a concentration of 30%. In the wastewater treatment process, real-time sampling was conducted to detect a DMAC concentration, and detection results showed that, after the wastewater was treated for 10 min, a removal rate of DMAC in the wastewater to be treated reached 100%, and no iron mud was produced during the treatment, causing no secondary pollution.

It can be seen from Example 1 and Example 6 that, on the basis of Example 1, the addition of hydrogen peroxide during the toxic and refractory wastewater treatment process can further improve the treatment efficiency for toxic and refractory wastewater.

Example 7

In this example, a method for electrolysis-ozone-hydrogen peroxide-corrosion inhibitor coupling treatment on toxic and refractory wastewater was provided. The toxic and refractory wastewater to be treated was PNP wastewater with a concentration of 500 mg/L. In the wastewater treatment process, the initial pH of PNP wastewater was 6.4 without an adjustment. The method included the following steps:

A wastewater treatment reaction tank with the structure described above was adopted. Specifically, a plate anode and a plate cathode used were rectangular aluminum oxide plates; an area of the plate anode or the plate cathode was 60% of an area of a longitudinal section of the wastewater treatment reaction tank; and a distance between the plate anode and the plate cathode was 50% of a diameter of the wastewater treatment reaction tank. A specific stirring device used was a mechanical stirring device, and a specific aeration device was an aerator.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 10 $mA/cm^2$ under stirring, during which a corrosion inhibitor solution was pumped by a peristaltic pump into the wastewater treatment reaction tank at an amount of 20 mmol/h per liter of the effective volume of the wastewater treatment reaction tank (a pH of the toxic and refractory wastewater was increased to 10.3 after the corrosion inhibitor was added), industrial grade hydrogen peroxide with a concentration of 10% was pumped by a peristaltic pump into the wastewater treatment reaction tank at an amount of 10 mmol/h per liter of the effective volume of the wastewater treatment reaction tank, and ozone generated by the ozone generator was introduced into the toxic and refractory wastewater to be treated through the ozone delivery pipe and the aeration device at an amount of 3 g/h per liter of the effective volume of the wastewater treatment reaction tank. The corrosion inhibitor solution was a sodium molybdate solution with a concentration of 30%. In the wastewater treatment process, real-time sampling was conducted to detect a PNP concentration, and detection results showed that, after the wastewater was treated for 15 min, a removal rate of PNP in the wastewater to be treated reached 100%, and no iron mud was produced during the treatment, causing no secondary pollution.

Example 8

In this example, a method for electrolysis-ozone-corrosion inhibitor coupling treatment on toxic and refractory wastewater was provided. The toxic and refractory wastewater to be treated was AO7 wastewater with a concentration of 1,000 mg/L. In the wastewater treatment process, the initial pH of AO7 wastewater was 3.0 without an adjustment. The method included the following steps:

A wastewater treatment reaction tank with the structure described above was adopted. Specifically, a plate anode and a plate cathode used were rectangular iron plates; an area of the plate anode or the plate cathode was 60% of an area of a longitudinal section of the wastewater treatment reaction tank; and a distance between the plate anode and the plate cathode was 50% of a diameter of the wastewater treatment reaction tank. A specific stirring device used was a magnetic stirring device, and a specific aeration device was an aeration plate.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 20 mA/cm$^2$ under stirring, during which a corrosion inhibitor solution was pumped by a peristaltic pump into the wastewater treatment reaction tank at an amount of 20 mmol/h per liter of the effective volume of the wastewater treatment reaction tank (a pH of the toxic and refractory wastewater was increased to 7.8 after the corrosion inhibitor was added), industrial grade hydrogen peroxide with a concentration of 10% was pumped by a peristaltic pump into the wastewater treatment reaction tank at an amount of 10 mmol/h per liter of the effective volume of the wastewater treatment reaction tank, and ozone generated by the ozone generator was introduced into the toxic and refractory wastewater to be treated through the ozone delivery pipe and the aeration device at an amount of 4 g/h per liter of the effective volume of the wastewater treatment reaction tank. The corrosion inhibitor solution was a sodium phosphate solution with a concentration of 25%. In the wastewater treatment process, real-time sampling was conducted to detect an AO7 concentration, and detection results showed that, after the wastewater was treated for 10 min, a removal rate of AO7 in the wastewater to be treated reached 100%, a chroma removal rate also reached 100%, and no iron mud was produced during the treatment, causing no secondary pollution.

Example 9

In this example, a method for electrolysis-ozone-corrosion inhibitor coupling treatment on toxic and refractory wastewater was provided. The toxic and refractory wastewater to be treated was DDNP wastewater with a chemical oxygen demand (COD) concentration of 1,250 mg/L. In the wastewater treatment process, the initial pH of DDNP wastewater was 5.7 without an adjustment. The method included the following steps:

A wastewater treatment reaction tank with the structure described above was adopted. Specifically, a plate anode and a plate cathode used were rectangular iron plates; an area of the plate anode or the plate cathode was 70% of an area of a longitudinal section of the wastewater treatment reaction tank; and a distance between the plate anode and the plate cathode was 50% of a diameter of the wastewater treatment reaction tank. A specific stirring device used was a mechanical stirring device, and a specific aeration device was an aeration plate.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 20 mA/cm$^2$ under stirring, during which a corrosion inhibitor solution was pumped by a peristaltic pump into the wastewater treatment reaction tank at an amount of 20 mmol/h per liter of the effective volume of the wastewater treatment reaction tank (a pH of the toxic and refractory wastewater was increased to 9.7 after the corrosion inhibitor was added), industrial grade hydrogen peroxide with a concentration of 10% was pumped by a peristaltic pump into the wastewater treatment reaction tank at an amount of 15 mmol/h per liter of the effective volume of the wastewater treatment reaction tank, and ozone generated by the ozone generator was introduced into the toxic and refractory wastewater to be treated through the ozone delivery pipe and the aeration device at an amount of 5 g/h per liter of the effective volume of the wastewater treatment reaction tank. The corrosion inhibitor solution was a sodium polysilicate solution with a concentration of 15%. In the wastewater treatment process, real-time sampling was conducted to detect a DDNP concentration, and detection results showed that, after the wastewater was treated for 15 min, a removal rate of DDNP in the wastewater to be treated reached 98.9%, a chroma removal rate also reached 99.5%, and no iron mud was produced during the treatment, causing no secondary pollution.

Example 10

In this example, a method for electrolysis-ozone-corrosion inhibitor coupling treatment on toxic and refractory wastewater was provided. The toxic and refractory wastewater to be treated was shale gas HFW with a COD concentration of 3,548 mg/L. In the wastewater treatment process, the initial pH of the wastewater was 6.7 without an adjustment. The method included the following steps:

A wastewater treatment reaction tank with the structure described above was adopted. Specifically, a plate anode and a plate cathode used were rectangular iron plates; an area of the plate anode or the plate cathode was 70% of an area of a longitudinal section of the wastewater treatment reaction tank; and a distance between the plate anode and the plate cathode was 50% of a diameter of the wastewater treatment reaction tank. A specific stirring device used was a mechanical stirring device, and a specific aeration device was an aeration plate.

The toxic and refractory wastewater to be treated was added into the aforementioned wastewater treatment reaction tank equipped with the plate anode and plate cathode until the toxic and refractory wastewater to be treated at least submerged the plate anode and plate cathode, and then the DC power supply connected to the plate anode and plate cathode was started to treat the toxic and refractory wastewater at a current density of 30 mA/cm$^2$ under stirring, during which a corrosion inhibitor solution was pumped by a peristaltic pump into the wastewater treatment reaction tank at an amount of 30 mmol/h per liter of the effective volume of the wastewater treatment reaction tank (a pH of the toxic and refractory wastewater was increased to 10.5 after the corrosion inhibitor was added), industrial grade hydrogen peroxide with a concentration of 15% was pumped by a peristaltic pump into the wastewater treatment reaction tank at an amount of 25 mmol/h per liter of the effective volume of the wastewater treatment reaction tank, and ozone generated by the ozone generator was introduced into the toxic and refractory wastewater to be treated through the ozone delivery pipe and the aeration device at an amount of 7 g/h per liter of the effective volume of the wastewater treatment reaction tank. The corrosion inhibitor solution was a sodium polysilicate solution with a concentration of 35%.

In the wastewater treatment process, real-time sampling was conducted to detect a COD concentration, and detection results showed that, after the wastewater was treated for 20 min, a removal rate of COD in the wastewater to be treated reached 98.5%, and no iron mud was produced during the treatment, causing no secondary pollution.

What is claimed is:

1. A method for electrolysis-ozone-corrosion inhibitor/electrolysis-ozone-hydrogen peroxide-corrosion inhibitor coupling treatment on toxic and refractory wastewater, wherein a wastewater treatment reaction tank used in the method is composed of a cylindrical tank body with a closed lower end and an open upper end, and a sealing cover arranged at the open end of the tank body;

a stirring device is provided inside the cylindrical tank body; a water inlet pipe, a water outlet pipe, an ozone delivery pipe, a corrosion inhibitor feeding pipe, and a hydrogen peroxide feeding pipe are provided on the cylindrical tank body; the sealing cover arranged at the open end of the cylindrical tank body is a conical cover body, and a residual ozone discharge pipe is provided at a top end of the conical cover body;

the residual ozone discharge pipe is connected to a residual ozone removal device provided to remove unused ozone during a toxic and refractory wastewater treatment process; a first end of the ozone delivery pine is connected to an ozone generator outside the cylindrical tank body, and a second end is located inside the cylindrical tank body and connected to an aeration device;

the corrosion inhibitor feeding pipe communicates with a corrosion inhibitor solution storage tank through a peristaltic pump, the hydrogen peroxide feeding pipe communicates with a hydrogen peroxide solution storage tank through a peristaltic pump, and the water inlet pine communicates with a to-be-treated toxic and refractory wastewater reservoir through a water inlet pump; the stirring device is a mechanical stirring device or a magnetic stirring device;

a plate anode and a plate cathode are arranged in the wastewater treatment reaction tank; shapes and areas of the plate anode and the plate cathode are identical, and the plate anode and the plate cathode are rectangular; the plate anode and the plate cathode are parallel to each other and are parallel to an axis of the cylindrical tank body; the plate anode and the plate cathode are arranged at the same height; the areas of the plate anode or the plate cathode are 40% to 80% of an area of a longitudinal section of the wastewater treatment reaction tank; and a distance between the plate anode and the plate cathode is 20% to 60% of a diameter of the wastewater treatment reaction tank; the plate anode and the plate cathode are connected to a direct current (DC) power supply through an electric wire; the plate anode and the plate cathode are selected from the group consisting of iron plates, stainless steel plates, aluminum plates, and aluminum oxide plates;

the method comprises:

preparing a corrosion inhibitor into a corrosion inhibitor solution and storing the corrosion inhibitor solution in the corrosion inhibitor solution storage tank;

preparing hydrogen peroxide into a hydrogen peroxide solution and storing the hydrogen peroxide solution in the hydrogen peroxide solution storage tank;

pumping toxic and refractory wastewater to be treated by the water inlet pump into the wastewater treatment reaction tank through the water inlet pipe until the toxic and refractory wastewater to be treated at least submerges the plate anode and the plate cathode;

starting the DC power supply connected to the plate anode and the plate cathode to treat the toxic and refractory wastewater at a current density of 1 $mA/cm^2$ to 100 $mA/cm^2$ under stirring, wherein the time of treating the toxic and refractory wastewater is controlled to be not more than 60 min;

during the toxic and refractory wastewater treatment process, pumping the corrosion inhibitor into the wastewater treatment reaction tank by the peristaltic pump through the corrosion inhibitor feeding pipe, pumping the hydrogen peroxide solution into the wastewater treatment reaction tank by the peristaltic pump through the hydrogen peroxide feeding pipe, and introducing ozone generated by the ozone generator into the toxic and refractory wastewater to be treated through the ozone delivery pipe and the aeration device;

introducing unreacted ozone in the wastewater treatment reaction tank into the residual ozone removal device through the residual ozone discharge pipe for removal; and discharging the wastewater through the water outlet pipe after the toxic and refractory wastewater treatment process is completed;

wherein the corrosion inhibitor is at least one from the group consisting of silicate, chromate, molybdate, phosphate, polyphosphate, and polysilicate, a rate of the hydrogen peroxide is controlled to be at 0 mmol/h or 1 mmol/h to 100 mmol/h per liter of an effective volume of the wastewater treatment reaction tank.

2. The method according to claim 1, wherein the corrosion inhibitor is added in the form of the corrosion inhibitor solution to the wastewater treatment reaction tank during the toxic and refractory wastewater treatment process, and the corrosion inhibitor is added at an amount of 1 mmol/h to 100 mmol/h per liter of the effective volume of the wastewater treatment reaction tank.

3. The method according to claim 1, wherein the ozone is introduced into the toxic and refractory wastewater to be treated through the aeration device at an amount of 1 g/h to 50 g/h per liter of the effective volume of the wastewater treatment reaction tank.

4. The method according to claim 1, wherein the aeration device is an aeration plate, an aerator, or a microporous gas diffuser.

5. The method according to claim 1, wherein a pH of the toxic and refractory wastewater to be treated is 3 to 10.5.

* * * * *